March 21, 1961  A. PONNOCK  2,975,823
METHOD OF MAKING HOLLOW PLASTIC BALLS AND OTHER HOLLOW BODIES
Filed Aug. 7, 1958

INVENTOR.
ABRAHAM PONNOCK
BY
ATTORNEYS

United States Patent Office 2,975,823
Patented Mar. 21, 1961

2,975,823

METHOD OF MAKING HOLLOW PLASTIC BALLS AND OTHER HOLLOW BODIES

Abraham Ponnock, 5624 Overbrook Ave., Philadelphia, Pa.

Filed Aug. 7, 1958, Ser. No. 753,735

5 Claims. (Cl. 154—16)

My invention relates to a method for making hollow plastic balls and particularly relates to a process for heat sealing the edges of semi-spherical sheets together having at least one aperture or opening therein which is utilized to retard the speed or decrease the distance of flight of the ball when hit or thrown.

Prior art methods of manufacture of foraminous hollow plastic balls have utilized cement or solvent to adhere the abutting edges of semi-spherical plastic shells. This usually resulted in an imperfect joint which was very susceptible to splitting at the seam even with a minimum of use. Other methods of manufacture employed flanges upon the edges of the semi-spherical shells which engaged in overlapping engagement with each other at added expense. Still other fabricating processes endeavored to heat and soften the edges of the shells and after removal of the heat source forced the edges into abutting aligned engagement which required considerable time or expensive machinery in order to afford perfect registration.

It therefore is an object of my invention to provide a method for welding two semi-spherical plastic shells together.

Another object of my invention is to provide a method for making a hollow foraminous plastic ball which will have a limited flight when driven or thrown.

Another object of my invention is to provide a method for heat sealing the edges of semi-spherical plastic shells in perfect registration.

Another object of my invention is to provide a method for heat sealing the abutting edges of semi-spherical shells after the shells have been aligned.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
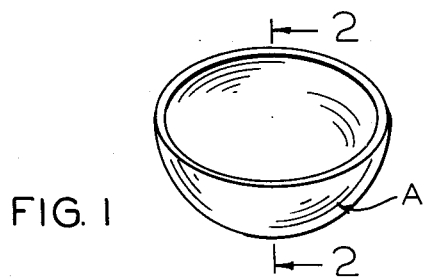
Fig. 1 is a perspective view of a semi-spherical plastic shell embodying one step of my invention.
Figure 2:
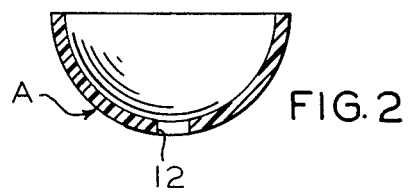
Fig. 2 is a sectional view taken along lines 2—2 of Fig. 1.

Referring now in greater detail to the drawings in which similar reference characters refer to similar parts, I show a pair of plastic semi-spherical shells, generally designated as A and B whose edges are brought into complementary abutting engagement and then fused together without application of any solvent or cement.

Figure 3:
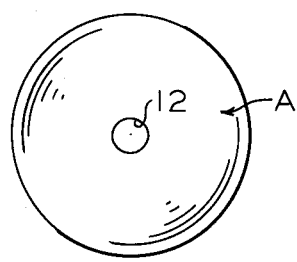
Fig. 3 is a top plan view of a semi-spherical plastic shell having a single aperture therein.
Figure 4:
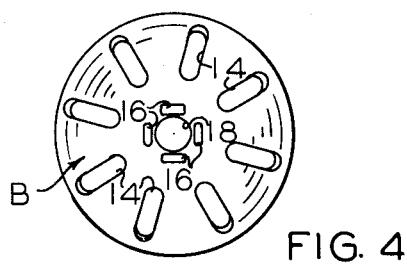
Fig. 4 is a top plan view of a semi-spherical plastic shell having a plurality of apertures therein.

Each shell is molded by conventional injection or compression molding procedures utilizing a thermo-plastic composition preferably polyethylene because of its ability to withstand hard impacts, flexing or compression without injury thereto. It is to be observed that the shell A may be molded in suitable dies as a semi-spheroid having an end aperture 12 axially disposed at the apex thereof or may have the aperture subsequently pierced after a continuous semi-spheroidal shell has been molded. See Fig. 3. In a similar fashion, the shell B, as shown in Fig. 4, may be molded with a plurality of elongated slots 14 therethrough radially positioned within the shell surface together with rectangular holes 16 circumferentially arranged in the surface intermediate the slots 14 and the apex of the semi-spheroid. The shell B also should be provided with an end aperture 18 at the apex. Likewise, the slots 14, the holes 16 and the aperture 18 may be punched from a continuous semi-spheroidal shell after the molding. The edges of the shells A and B should be preferably flat so that a pair of the halves may be placed together in flat abutment.

It is to be observed that any combination of complementary halves or semi-spheres may be employed to form the hollow sphere such as shell A combined with a second shell A, shell B combined with a second shell B, or shell A with shell B. It is to be further noted that one of the shells A when combined with a second shell A may, if desired, have a continuous spheroidal surface without an aperture 12 in order to perform my process. That is, the subsequent operations of my method contemplate the use of at least one aperture in at least one of the half sections in order that the subsequent welding of the complementary shells may be satisfactorily accomplished as will be fully apparent from the description immediately following.

Figure 5:
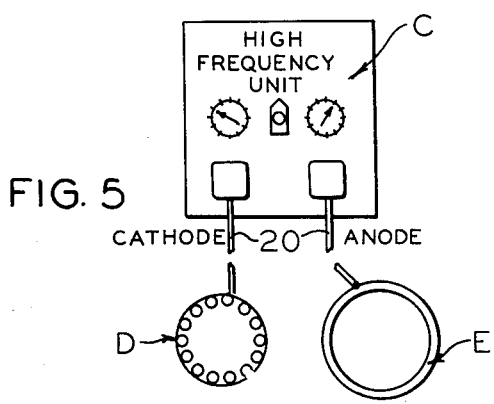
Fig. 5 is a perspective view of a heating apparatus employed with my invention.
Figure 6:
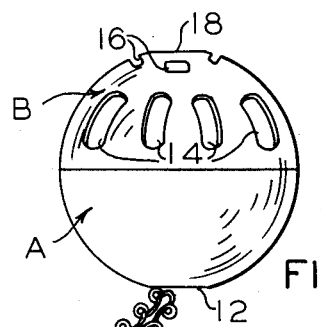
Fig. 6 is a perspective view of one element of the heating apparatus being applied through an aperture in the semi-spherical shell after the edges of complementary shells have been placed in registering abutment.

As is seen from Fig. 5, the welding operation utilizes a radio frequency, di-electric power source C having a flexible element or electrode D and a rigid element E connected to the cathode and anode respectively through lead wires 20. The radio frequency power source C is a high frequency oscillator generating from 10 to 100 megacycles and effects the di-electric heating of articles disposed intermediate the electrodes D and E. The electrode D is a flexible helically wound coil whose ends are adjoined to form an annular ring when no external mechanical forces are applied thereto. However, because of the flexible nature of the coil, it may be collapsed into a narrow elongated configuration which will freely pass through one of the apertures in either of the shell halves. The maximum diameter of the annulus of the electrode D is less than the inner diameter of the assembled sphere, or accordingly the electrode D will be annularly spaced from the great circle defined by the complementary abutting edges of the semi-spherical shells when in registration. The electrode E is a metal annular ring whose inner diameter is greater than the external diameter of the sphere whereby the electrode may be annularly and adjacently spaced from the registering and abutting edges of the complementary semi-spherical shells.

Figure 7:
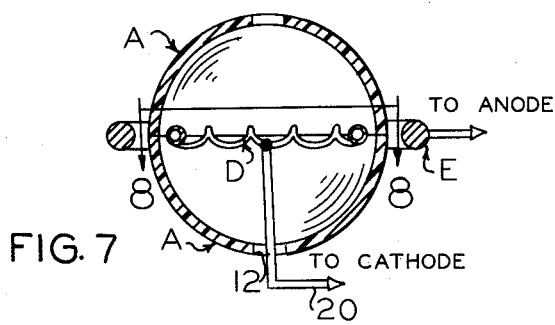
Fig. 7 is a sectional view of the ball with the heating elements in position, the section being taken at right angles to the plane of the abutting edges.
Figure 8:
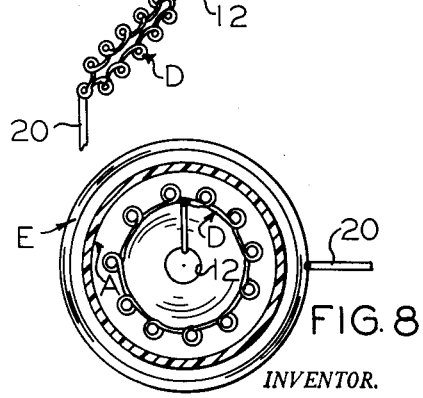
Fig. 8 is a sectional view taken along lines 8—8 of Fig. 7.

The next step of my process is accomplished by axially aligning complementary pairs of shells with the edges thereof in registering abutment. This may be performed by hand, in automatic machinery, or by suitable dies fitting about the ball halves such as not to enclose the aperture through which the flexible electrode D is to be inserted. Inward pressure is exerted upon the abutting edges of the two complementary shells. As shown in Fig. 5, the electrode D is collapsed and passed through the aperture 12 in the shell A whereupon when free of the aperture it will tend to spring back once more into a ring configuration. The electrode D may have a slender rod integral therewith or a tool which will extend through the aperture 12 in order to assist positioning within the interior of the closed but not yet fused shells. As shown in Figs. 7 and 8, the electrode D, the abutting edges of the complementary shells, and the electrode E are all concentrically arranged within a single plane, the electrode D being positioned interiorly and the electrode E passed exteriorly about the combined shells. By applying power from the generator C to the electrodes, the high frequency magnetic waves will pass from the electrode D through the shells adjacent the abutting edges thereof to the electrode E. It is characteristic of di-electric type heating to generate the highest temperature at the area intermediate the electrodes and, in the present example, the annulus defined by the circular zone of the hollow ball coplanar with the electrodes when the temperature of the required degree is reached, softening or melting of the thermoplastic material adjacent the abutting edges occurs. Since the melting or breakdown of the edges occurs while opposing pressure is applied thereto, the application of heat and pressure will cause the complementary edges to fuse and weld together. When the parts cool, the two shells will be welded together integrally. The electrode D is then withdrawn in collapsed condition through the aperture 12 and the completed sphere removed from the dies.

A slight amount of molten plastic or flash will have exuded at the periphery of the abutting edges as a result of the application of heat and pressure thereon. This flash can be readily removed abrasively by hand with sand paper or by tumbling the balls in a vessel such as a rolling mill.

While I have shown the electrode D applied through the axially disposed aperture in one of the shells, it may be passed through any aperture of the shell B or, in addition, through an aperture oriented the periphery of the abutting edges. The process can also be applied to any plastic hollow body such as a bottle by passing an appropriately configured flexible coil type electrode through the mouth after the symmetrical halves have been placed in registration.

Although my invention has been described in considerable detail, such description is intended as being illustrative rather than limiting, since the invention may be variously embodied, and the scope of the invention is to be determined as claimed.

I claim as my invention:

1. A method for forming a thermo-plastic hollow body comprising the steps of forming a pair of shells having complementary registering edges, at least one of said shells having at least one aperture therein, bringing the complementary edges into abutment with application of pressure, applying high frequency di-electric power across and through said complementary edges with the simultaneous application of pressure against the shells normal to the plane of the abutting edges, said high frequency di-electric power being applied by inserting a first electrode through said aperture into the interior of said abutting shells, whereby the electrode will assume an interior position adjacent the abutting edges, mounting a second electrode exterior of the abutting shells and annularly spaced from said abutting edges and the first electrode, whereby upon said application of high frequency di-electric power the area about said complementary edges will fuse and integrate said shells, and whereby said electrodes are subsequently withdrawn.

2. The method of claim 1 wherein said first electrode assumes an annulus complementary with the interior of said abutting shells and wherein said second electrode is mounted annularly spaced co-planar with said abutting edges and said first electrode.

3. The method of claim 1 wherein said first electrode is flexible so that it may be collapsed into a narrow elongated configuration which will freely pass through said aperture.

4. The method of claim 1 wherein said shells are united to form a ball.

5. The method of claim 1 wherein said shells are united to form a bottle.

References Cited in the file of this patent

UNITED STATES PATENTS

| | | |
|---|---|---|
| 2,477,040 | Brown et al. | July 26, 1949 |
| 2,597,704 | Carlson | May 20, 1952 |
| 2,598,629 | Whyte | May 27, 1952 |
| 2,642,911 | DeShazor | June 22, 1953 |
| 2,666,831 | Seulen et al. | Jan. 19, 1954 |
| 2,721,600 | Perryman | Oct. 25, 1955 |
| 2,741,402 | Sayre | Apr. 10, 1956 |